(12) United States Patent
Subbian et al.

(10) Patent No.: US 7,792,853 B2
(45) Date of Patent: Sep. 7, 2010

(54) PRESENTING DATA FLOW IN LEGACY PROGRAM

(76) Inventors: Ragothaman Subbian, No. 17, Second Floor, 100ft Ring Road, 3rd Phase, 6th Block, BSK 3rd Stage, Kathriguppe, Bangalore (IN) 560 085; Usha Raikar, No. 17, Second Floor, 100ft Ring Road, 3rd Phase, 6th Block, BSK 3rd Stage, Kathriguppe, Bangalore (IN) 560 085

( * ) Notice: Subject to any disclaimer, the term of this patent is extended or adjusted under 35 U.S.C. 154(b) by 425 days.

(21) Appl. No.: 11/698,577

(22) Filed: Jan. 25, 2007

(65) Prior Publication Data
US 2008/0109471 A1     May 8, 2008

(30) Foreign Application Priority Data
Nov. 8, 2006    (IN)    .................. 2063/CHE/2006

(51) Int. Cl.
*G06F 12/00*    (2006.01)
(52) U.S. Cl. ...................... 707/762; 717/116

(58) Field of Classification Search .............. 707/3–6, 707/10, 200–205; 717/116; 705/1, 7
See application file for complete search history.

(56) References Cited

U.S. PATENT DOCUMENTS

| | | |
|---|---|---|
| 5,848,426 A | 12/1998 | Wang et al. |
| 6,609,099 B1 | 8/2003 | Matsuzaki |
| 6,832,229 B2 | 12/2004 | Reed |
| 2001/0044811 A1* | 11/2001 | Ballantyne et al. .......... 707/513 |
| 2003/0226132 A1* | 12/2003 | Tondreau et al. ............ 717/116 |

* cited by examiner

*Primary Examiner*—Wilson Lee
(74) *Attorney, Agent, or Firm*—Ash Tankha

(57) ABSTRACT

Disclosed herein is a method for presenting data flow in legacy programs from one device to another by representing the relation between blocks of code in the legacy program and multiple data variables present in the program. The method and system disclosed herein defines the grammar of the legacy language and builds the relational database of the legacy programs based on the grammar. The method defines the action of a block of code within the legacy programs by identifying data variables and mapping the relation between the actions and the data variables.

10 Claims, 14 Drawing Sheets

| PROGRAM ID | LNE ID * | SOURCE CODE | UCCESS IND |
|---|---|---|---|
| 0001 | 1 | 01001 IDENTIFICATION DIVISION | Y |
| 0001 | 2 | 01002 PROGRAM-ID. EXAMPLE | Y |
| 0001 | 3 | 01003 ENVIRONMENT DIVISION. | Y |
| 0001 | 4 | 01004 INPUT-OUTPUT SECTION. | Y |
| 0001 | 5 | 01005 FILE-CONTROL. | Y |
| 0001 | 6 | 01006     SELECT EMPLOYEE-DATA           ASSIGN TO DISK. | Y |
| 0001 | 7 | 01007     SELECT TIME-LIST              ASSIGN TO SYS$OUTPUT. | Y |
| 0001 | 8 | 01008 DATA DIVISION. | Y |
| 0001 | 9 | 01009 FILE SECTION. | Y |
| 0001 | 10 | 01010 FD    EMPLOYEE-DATA.              LABEL RECORDS ARE STANDARD. | Y |
| 0001 | 11 | 01011 01    EMPLOYEE-RECORD | Y |
| 0001 | 12 | 01012     05   EMPLOYEE-NAME             PIC X(20). | Y |
| 0001 | 13 | 01013     05   HOURS-WORKED              PIC 999.9. | Y |
| 0001 | 14 | 01014     05   OVERTIME-WORKED           PIC 99.9. | Y |
| 0001 | 15 | 01015     05   RATE-OF-PAY               PIC 99.99. | Y |
| 0001 | 16 | 01016 FD    TIME-LISTING                 LABEL RECORDS ARE STANDARD. | Y |
| 0001 | 17 | 01017 01    TIME-RECORD | Y |
| 0001 | 18 | 01018     05   FILLER                    PIC XXXX. | Y |
| 0001 | 19 | 01019     05   EMPLOYEE-NAME-OUT         PIC X(20). | Y |
| 0001 | 20 | 01020     05   FILLER                    PIC XXXX. | Y |
| 0001 | 21 | 01021     05   RATE-OF-PAY-OUT           PIC 999.9. | Y |
| 0001 | 22 | 01022     05   FILLER                    PIC XXXX. | Y |
| 0001 | 23 | 01023     05   HOURS-WORKED-OUT          PIC 999.9. | Y |
| 0001 | 24 | 01024     05   FILLER                    PIC XXXX. | Y |
| 0001 | 25 | 01025     05   OVERTIME-WORKED-OUT       PIC 99.9. | Y |
| 0001 | 26 | 01026     05   FILLER                    PIC XXXX. | Y |
| 0001 | 27 | 01027     05   WAGES-OUT                 PIC 999.99. | Y |
| 0001 | 28 | 01028     05   FILLER                    PIC XXXX. | Y |
| 0001 | 29 | 01029     05   OT-INDICATOR              PIC X. | Y |
| 0001 | 30 | 01030 WORKING-STORAGE SECTION. | Y |
| 0001 | 31 | 01031 01    EMPLOYEE-FILE-STATUS.         PIC XXX. | Y |
| 0001 | 32 | 01032     88   NO-MORE-RECORDS           VALUE 'NO'. | Y |
| 0001 | 33 | 01033     88   SOME-MORE-RECORDS         VALUE 'YES'. | Y |
| 0001 | 34 | 01034 01    NORMAL-WAGES                 PIC 999.99. | Y |
| 0001 | 35 | 01035 01    OVERTIME-WAGES               PIC 999.99. | Y |
| 0001 | 36 | 01036 * | Y |
| 0001 | 37 | 01037 *PROGRAM TO CALCULATE WAGES AND INDICATE WITH # WHEN EMPLOYEE | Y |
| 0001 | 38 | 01038 *HAS CLOCKED OVERTIME MORE THAN 8 HOURS. | Y |
| 0001 | 39 | 01039 PROCDEURE-DIVISION. | Y |
| 0001 | 40 | 01040 100-MAIN-MODULE. | Y |
| 0001 | 41 | 01041     OPEN INPUT EMPLOYEE-DATA. | Y |
| 0001 | 42 | 01042     OPEN OUTPUT TIME-LISTING. | Y |
| 0001 | 43 | 01043     MOVE SOME-MORE-RECORDS TO EMPLOYEE-FILE-STATUS. | Y |
| 0001 | 44 | 01044     READ EMPLOYEE-RECORD | Y |
| 0001 | 45 | 01045         AT END MOVE NO-MORE-RECORDS TO EMPLOYEE-FILE-STATUS. | Y |
| 0001 | 46 | 01046     PERFORM 200-OT-FUNCTION | Y |
| 0001 | 47 | 01047         UNTIL NO-MORE-RECORDS. | Y |
| 0001 | 48 | 01048     CLOSE EMPLOYEE-DATA TIME-LISTING. | Y |
| 0001 | 49 | 01049     STOP RUN. | Y |
| 0001 | 50 | 01050 200-OT-FUNCTION. | Y |
| 0001 | 51 | 01051     MOVE SPACES TO TIME-RECORD. | Y |
| 0001 | 52 | 01052     MOVE EMPLOYEE-NAME TO EMPLOYEE-NAME-OUT. | Y |
| 0001 | 53 | 1053      MOVE RATE-OF-PAY TO RATE-OF-PAY-OUT. | Y |

| 0001 | 54 | 01054 | MOVE HOURS-WORKED TO HOURS-WORKED-OUT. | Y |
|---|---|---|---|---|
| 0001 | 55 | 01055 | MOVE OVERTIME-WORKED TO OVERTIME-WORKED-OUT. | Y |
| 0001 | 56 | 01056 | MULTIPLY HOURS-WORKED BY RATE-OF-PAY GIVING NORMAL-WAGES. | Y |
| 0001 | 57 | 01057 | MULTIPLY OVERTIME-WORKED BY RATE-OF-PAY GIVING OVERTIME-WAGES. | Y |
| 0001 | 58 | 01058 | MULTIPLY OVERTIME-WAGES BY 2 GIVING OVERTIME-WAGES. | Y |
| 0001 | 59 | 01059 | ADD OVERTIME-WAGES NORMAL-WAGES TO WAGES-OUT. | Y |
| 0001 | 60 | 01060 | IF OVERTIME-WORKED IS GREATER THAN 8.0 THEN | Y |
| 0001 | 61 | 01061 | MOVE '#' TO OT-INDICATOR. | Y |
| 0001 | 62 | 01062 | WRITE TIME-RECORD. | Y |
| 0001 | 63 | 01063 | READ EMPLOYEE-RECORD | Y |
| 0001 | 64 | 01064 | AT END MOVE NO-MORE-RECORDS TO EMPLOYEE-FILE-STATUS. | Y |
| 0001 | 65 | 01065 | END 200-OT-FUNCTION. | Y |

FIG. 5B

| PROGRAM ID | TOKEN ID | TOKEN NAME | LINE ID | RESERVED WORD ID | USAGE TYPE | VARIABLE ID |
|---|---|---|---|---|---|---|
| 0001 | 0001 | 100-MAIN-MODULE | 40 | NULL | | |
| 0001 | 0002 | OPEN | 41 | 10210 | | |
| 0001 | 0003 | INPUT | 41 | 10161 | | |
| 0001 | 0004 | EMPLOYEE-DATA | 41 | | | 20000 |
| 0001 | 0005 | OPEN | 42 | 10210 | | |
| 0001 | 0006 | OUTPUT | 42 | 10216 | | |
| 0001 | 0007 | TIME-LISTING | 42 | | | 20006 |
| 0001 | 0008 | MOVE | 43 | 10193 | | |
| 0001 | 0009 | SOME-MORE-RECORDS | 43 | | K | 20022 |
| 0001 | 00010 | TO | 43 | 10325 | | |
| 0001 | 00011 | EMPLOYEE-FILE-STATUS | 43 | | K | 20020 |
| 0001 | 00012 | READ | 44 | 10243 | | |
| 0001 | 00013 | EMPLOYEE-RECORD | 44 | | I | 20001 |
| 0001 | 00014 | AT | 45 | 10023 | | |
| 0001 | 00015 | END | 45 | 10099 | | |
| 0001 | 00016 | MOVE | 45 | 10193 | | |
| 0001 | 00017 | NO-MORE-RECORDS | 45 | | K | 20021 |
| 0001 | 00018 | TO | 45 | 10325 | | |
| 0001 | 00019 | EMPLOYEE-FILE-STATUS | 45 | | K | 20020 |

— Continued —

| | | | | | | |
|---|---|---|---|---|---|---|
| 0001 | 00020 | MOVE | 54 | 10193 | | |
| 0001 | 00021 | HOURS-WORKED | 54 | | R | 20003 |
| 0001 | 00022 | TO | 54 | 10325 | | |
| 0001 | 00023 | HOURS-WORKED-OUT | 54 | | V | 20013 |
| 0001 | 00024 | MOVE | 55 | 10193 | | |
| 0001 | 00025 | OVERTIME-WORKED | 55 | | R | 20004 |
| 0001 | 00026 | TO | 55 | 10325 | | |
| 0001 | 00027 | OVERTIME-WORKED-OUT | 55 | | V | 20015 |
| 0001 | 00028 | MULTIPLY | 56 | 10195 | | |
| 0001 | 00029 | HOURS-WORKED | 56 | | R | 20003 |
| 0001 | 00030 | BY | 56 | 10030 | | |
| 0001 | 00031 | RATE-OF-PAY | 56 | | R | 20005 |
| 0001 | 00032 | GIVING | 56 | 10143 | | |
| 0001 | 00033 | NORMAL-WAGES | 56 | | V | 20023 |
| 0001 | 00034 | MULTIPLY | 57 | 10195 | | |
| 0001 | 00035 | OVERTIME-WORKED | 57 | | R | 20004 |
| 0001 | 00036 | BY | 57 | 10030 | | |
| 0001 | 00037 | RATE-OF-PAY | 57 | | R | 20005 |
| 0001 | 00038 | GIVING | 57 | 10143 | | |
| 0001 | 00039 | OVERTIME-WAGES | 57 | | V | 20024 |
| 0001 | 00040 | MULTIPLY | 58 | 10195 | | |
| 0001 | 00041 | OVERTIME-WAGES | 58 | | R | 20024 |
| 0001 | 00042 | BY | 58 | 10030 | | |
| 0001 | 00043 | 2 | 58 | | | |
| 0001 | 00044 | GIVING | 58 | 10143 | | |
| 0001 | 00045 | OVERTIME-WAGES | 58 | | V | 20024 |

FIGURE 6

| Program ID | VARIABLE ID | VARIABLE NAME | LINE ID | LEVEL NO |
|---|---|---|---|---|
| 0001 | 20000 | EMPLOYEE-DATA | 010 | |
| 0001 | 20001 | EMPLOYEE-RECORD | 011 | 01 |
| 0001 | 20002 | EMPLOYEE-NAME | 012 | 05 |
| 0001 | 20003 | HOURS-WORKED | 013 | 05 |
| 0001 | 20004 | OVERTIME-WORKED | 014 | 05 |
| 0001 | 20005 | RATE-OF-PAY | 015 | 05 |
| 0001 | 20006 | TIME-LISTING | 016 | |
| 0001 | 20007 | TIME-RECORD | 017 | 01 |
| 0001 | 20008 | FILLER | 018 | 05 |
| 0001 | 20009 | EMPLOYEE-NAME-OUT | 019 | 05 |
| 0001 | 20010 | FILLER | 020 | 05 |
| 0001 | 20011 | RATE-OF-PAY-OUT | 021 | 05 |
| 0001 | 20012 | FILLER | 022 | 05 |
| 0001 | 20013 | HOURS-WORKED-OUT | 023 | 05 |
| 0001 | 20014 | FILLER | 024 | 05 |
| 0001 | 20015 | OVERTIME-WORKED-OUT | 025 | 05 |
| 0001 | 20016 | FILLER | 026 | 05 |
| 0001 | 20017 | WAGES-OUT | 027 | 05 |
| 0001 | 20018 | FILLER | 028 | 05 |
| 0001 | 20019 | OT-INDICATOR | 029 | 05 |
| 0001 | 20020 | EMPLOYEE-FILE-STATUS | 031 | 01 |
| 0001 | 20021 | NO-MORE-RECORDS | 032 | 88 |
| 0001 | 20022 | SOME-MORE-RECORDS | 033 | 88 |
| 0001 | 20023 | NORMAL-WAGES | 034 | 01 |
| 0001 | 20024 | OVERTIME-WAGES | 035 | 01 |

FIGURE 7

| PROGRAM ID | VARIABLE ID | Line ID | INIT VALUE |
|---|---|---|---|
| 0001 | 20021 | 032 | NO |
| 0001 | 20022 | 033 | YES |

FIGURE 8

| COLUMN NAMES | ROW INFO FOR DEVICE 1 | ROW INFO FOR DEVICE 2 |
|---|---|---|
| PROGRAM ID | 0001 | 0001 |
| DEVICE ID | 01 | 02 |
| DEVICE NAME | EMPLOYEE-DATA | TIME-LIST |
| LINE ID | 006 | 007 |

FIGURE 9

| PROGRAM ID | DEVICE ID | FIELD NUMBER | LINE ID | VARIABLE ID |
|---|---|---|---|---|
| 0001 | 01 | 0001 | 011 | 20001 |
| 0001 | 01 | 0002 | 012 | 20002 |
| 0001 | 01 | 0003 | 013 | 20003 |
| 0001 | 01 | 0004 | 014 | 20004 |
| 0001 | 01 | 0005 | 015 | 20005 |
| 0001 | 02 | 0001 | 017 | 20007 |
| 0001 | 02 | 0002 | 018 | 20008 |
| 0001 | 02 | 0003 | 019 | 20009 |
| 0001 | 02 | 0004 | 020 | 20010 |
| 0001 | 02 | 0005 | 021 | 20011 |
| 0001 | 02 | 0006 | 022 | 20012 |
| 0001 | 02 | 0007 | 023 | 20013 |
| 0001 | 02 | 0008 | 024 | 20014 |
| 0001 | 02 | 0009 | 025 | 20015 |
| 0001 | 02 | 0010 | 026 | 20016 |
| 0001 | 02 | 0011 | 027 | 20017 |
| 0001 | 02 | 0012 | 028 | 20018 |
| 0001 | 02 | 0013 | 029 | 20019 |

FIGURE 10

| PROGRAM ID | BLOCK ID | LINE NUMBER FROM | LINE NUMBER TO |
|---|---|---|---|
| 0001 | 001 | 01039 | 01042 |
| 0001 | 002 | 01043 | 01043 |
| 0001 | 003 | 01044 | 01045 |
| 0001 | 004 | 01046 | 01047 |
| 0001 | 005 | 01048 | 01049 |
| 0001 | 006 | 01050 | 01059 |
| 0001 | 007 | 01060 | 01061 |
| 0001 | 008 | 01062 | 01062 |
| 0001 | 009 | 01063 | 01065 |

FIGURE 11

| Language External ID | COBOL | RPG | PL1 |
|---|---|---|---|
| Language Internal ID | 01 | 02 | 03 |
| Program Start rule ID | 2001 | 2101 | 2201 |
| Program End rule ID | 2002 | 2102 | 2202 |
| Tokenization Rule ID | 2003 | 2103 | 2203 |
| Line Continuation Rule ID | 2004 | 2104 | 2204 |
| Comment Line Rule ID | 2005 | 2105 | 2205 |

FIGURE 12

| LANGUAGE ID | RESERVED WORD ID | RESERVED WORD | WORD TYPE | VERB RULE ID | EXECUTION FLOW INDICATOR @ |
|---|---|---|---|---|---|
| 001 | 10001 | ACCEPT | V | 1001 | S |
| 001 | 10002 | ACCESS | K | | |
| 001 | 10003 | ADD | V | 1002 | C |
| 001 | 10004 | ADVANCING | K | | |
| 001 | 10005 | AFTER | K | | |
| 001 | 10006 | ALL | K | | |
| 001 | 10007 | ALPHABET | K | | |
| ~~~~ Continued ~~~~ | | | | | |
| 001 | 10063 | CURRENCY | K | | |
| 001 | 10064 | DATA | K | | |
| 001 | 10065 | DATE | S | | |
| 001 | 10066 | DATE-COMPILED | I | | |
| 001 | 10067 | DATE-WRITTEN | I | | |
| 001 | 10068 | DAY | S | | |
| 001 | 10069 | DAY-OF-WEEK | S | | |
| ~~~~ Continued ~~~~ | | | | | |
| 001 | 10193 | MOVE | V | 1050 | C |
| 001 | 10194 | MULTIPLE | K | | |
| 001 | 10195 | MULTIPLY | V | 1051 | C |
| 001 | 10196 | NATIVE | K | | |
| 001 | 10197 | NEGATIVE | K | | |
| ~~~~ Continued ~~~~ | | | | | |
| 001 | 10353 | > | O | | |
| 001 | 10354 | < | O | | |
| 001 | 10355 | >= | O | | |
| | | | | | |
| 001 | 10356 | <= | O | | |

FIGURE 13

DATA TRACKING - STATUS CHART

| BLOCK NUMBER | LINE NUMBER | EMPLOYEE DATA ||||  TIME-LISTING ||||||
|---|---|---|---|---|---|---|---|---|---|---|---|
| | | EMP NAME | HOURS WORKED | OVERTIME WORKED | RATE OF PAY | EMP-NAME-OUT | RATE-OF-PAY-OUT | HOURS-WORKED-OUT | OVERTIME-WORKED-OUT | WAGES-OUT | OT-INDICATOR |
| 1 | 039-042 | | | | | | | | | | |
| 2 | 043-043 | | | | | | | | | | |
| 3 | 044-045 | I | I | I | I | | | | | | |
| 4 | 046-047 | | | | | | | | | | |
| 5 | 048-049 | | | | | | | | | | |
| 6 | 050-059 | R | R | R | R | V | V | V | V | V | V |
| 7 | 060-061 | | | R | | | | | | | |
| 8 | 062-062 | | | | | W | W | W | W | W | W |
| 9 | 063-065 | I | I | I | I | | | | | | |

FIGURE 14

PRESENTING DATA FLOW IN LEGACY PROGRAM

BACKGROUND OF THE INVENTION

This invention in general relates to computer language software and in particular relates to a method for presenting data flow in legacy software programs.

There exists a market need for a uniform method for analyzing different source languages. There is a need for a method that can group large source codes into small block of codes and identify the nature of data present in each block and also determine the manner of flow of data between the blocks as well as track all variables used in each block of the program.

There is a market need for a common method of analysis for applications written in multiple legacy languages such as FORTRAN, COBOL, JOVIAL, NATURAL, etc., so as to determine to all legacy constructs that would need analysis, replacement or substitution when the application is ported to from one computer to another.

There is a market need for a method that indicates the program flow and its dependencies so that any user may implement changes in the program by locating the required sections of the program instead of tracing all the lines of code in the program.

SUMMARY OF THE INVENTION

Disclosed herein is a method for presenting data flow in legacy programs from one device to another by representing the relation between blocks of code in the legacy program to multiple data variables present in the program. The method and system disclosed herein defines the grammar of the legacy language and builds the relational database of the legacy programs based on the grammar. The method defines the action of a block of code within the legacy program by identifying data variables and mapping the relation between the blocks and the data variables.

The method and system disclosed herein makes it possible to group program codes into blocks of codes with its dependencies, and identifies the data variables used for each block; and identifies the nature of flow of information amongst them. Every variable can be tracked by the nature of its usage and can be used to present the data flow. The invention provides a uniform method of analyzing different source languages and represents the data flow from one device to another, and supports a better visual understanding of the system.

The method and system disclosed herein analyzes large programs as many individual blocks of statements within a legacy program and tracks all variables used or referred in a particular block of statements.

The method and system disclosed herein assigns different criteria or rules for the grammar of the reserved words of any required legacy language. As used herein, reserve words are key words in a computer language that have a definite meaning associated with them.

The method and system disclosed herein locates blocks of code that change the value of any given variable.

The method and system disclosed herein provides a common method of analysis amongst applications written in multiple legacy computer languages such as FORTRAN, COBOL, JOVIAL, NATURAL, etc.

The method and system disclosed herein analyzes all legacy constructs that would need replacement or substitution when the legacy program is ported to another computer.

The method and system disclosed herein provides a method of tracing a device and indicating the block where the device has been used. The method shows the line at which the devices are called and enables programmers to review legacy program in a time effective manner when the device contents are reviewed and changed.

The method and system disclosed herein indicates the program flow and its dependencies so that any user who wishes to change the program will only have to locate the required sections of the program instead of tracing all the lines of code in the program.

The method and system disclosed herein traces the variables that the block depends on for executing the flow of the program. Reserved words indicate the conditional actions that the language uses to determine the flow of the program.

BRIEF DESCRIPTION OF THE DRAWINGS

The foregoing summary, as well as the following detailed description of the embodiments, is better understood when read in conjunction with the appended drawings. For the purpose of illustrating the invention, there is shown in the drawings exemplary constructions of the invention; however, the invention is not limited to the specific methods and instrumentalities disclosed.

FIGS. 5A and 5B illustrate a data sample of a "source table" (shown for COBOL language).

FIG. 6 illustrates a data sample of a "program token table".

FIG. 7 illustrates a data sample of a "program variable table".

FIG. 8 illustrates a data sample of a "program init value table".

FIG. 9 illustrates a data sample of a "program file definition table"

FIG. 10 illustrates a data sample of a "program file attribute table"

FIG. 11 illustrates a data sample of a "program block table".

FIG. 12 illustrates a data sample of a "language definition table".

FIG. 13 illustrates a data sample of a "language reserved words table".

FIG. 14 illustrates a representation of the relation between the blocks of code in the legacy program with devices and usages of data variables for the sample program.

DETAILED DESCRIPTION OF THE INVENTION

Figure 1:
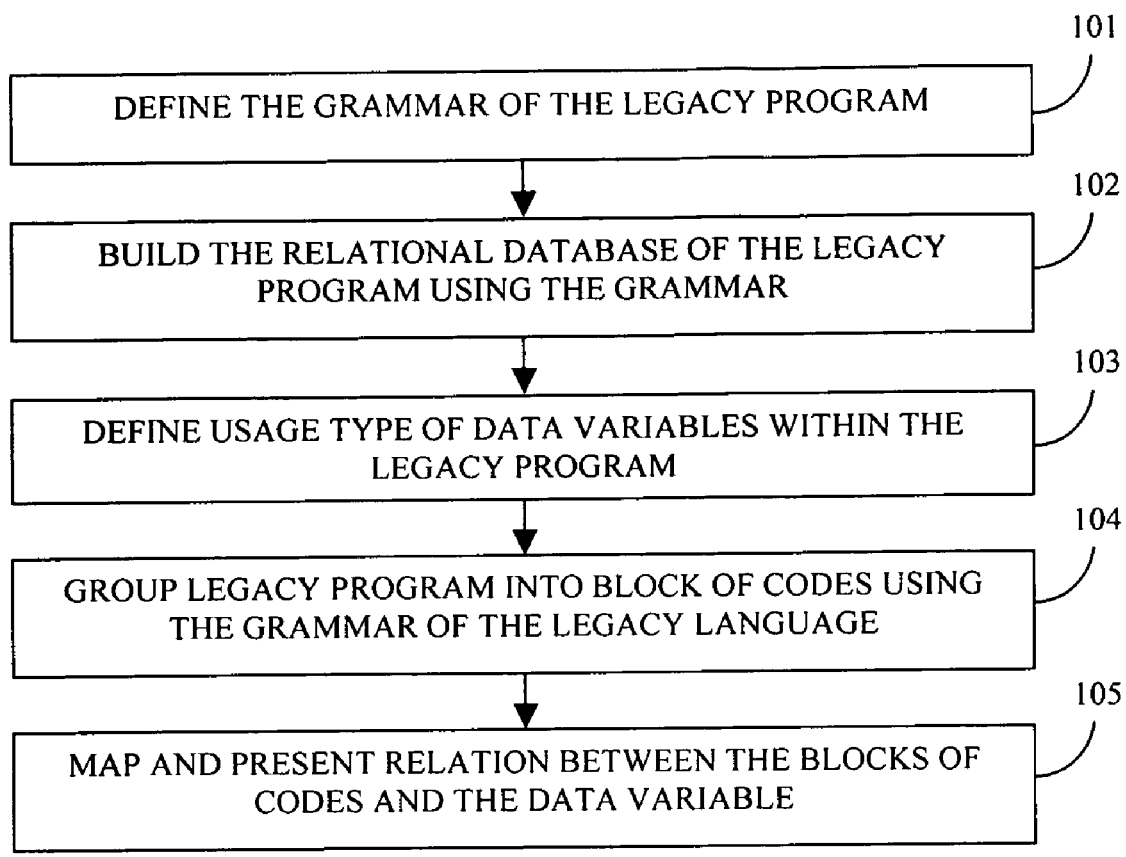
FIG. 1 illustrates a block diagram indicating the steps involved in presenting data flow from one device to another by structuring legacy languages, its grammar and program sources.

FIG. 1 illustrates a block diagram indicating the steps involved in presenting data flow from one device to another by structuring legacy languages, its grammar and program sources for programs written in any legacy language. As used herein, the term device is any unit that holds information either for accepting and displaying data or for writing or reading from a physical storage disk. "Device" is a generic name to represent any units and is referred to as files in most of the legacy languages. The grammar of the legacy language is represented in a language database by defining the following two tables: LANGUAGE DEFINITION TABLE 201 and LANGUAGE RESERVED WORDS TABLE 202.

The method is initiated by step 101 defining the grammar of the legacy program. All attributes of the grammar are defined in the LANGUAGE DEFINITION TABLE 201 and LANGUAGE RESERVED WORDS TABLE 202 for any given legacy language. The grammar of the language defines the form and interpretation of all statements in the given legacy language. The attributes of the LANGUAGE DEFINITION TABLE 201 are based on the language syntax. An Internal identifier (ID) is allotted to represent a given legacy language. Every statement in a legacy program is written based on the language definition. Conventional methods demand that each statement be analyzed individually. The disadvantage of such a conventional method is its inflexibility. The method and system disclosed herein enables specific rule ID to be associated with each of the reserved word so that any standard rule engine can be used. The rules defined for a legacy program include program start, program end, token forming rules, line definition rules and comment lines rules. The set of rules enables the logic for evaluating all valid statements and building the tokens. All the reserved words for a legacy language are defined in the LANGUAGE RESERVED WORDS TABLE 202. For each reserved word, three attributes are defined i.e. its type, its execution flow and associated verb rules ID. Assigning rule ID for each reserved word permits implementing standard rules engine for updating the nature of usage of the reserve words. The LANGUAGE RESERVED WORDS TABLE 202 is further described in FIG. 13.

Step 102 of the method builds the relational database for a legacy application that comprises a set of program files. A PROGRAM TABLE 301 holds the list of all programs and indicates its legacy language and the location where sources are available. The actual source code is captured in the SOURCE TABLE 302. Each line in a program is given a unique line ID. Each program is then analyzed into three major types; each type has its set of tables. The first type is the program tokens for all statements, the second type is the program variables for all variables used in the program, and the third type is the files and devices used in the set of programs. The PROGRAM VARIABLE TABLE 303 has a child table for initial values the variables may hold. The fields or columns of all the files are stored in the PROGRAM FILE ATTRIBUTE TABLE 308 as a child table of the PROGRAM FILE DEFINITION TABLE 307. A list of programs that need such analysis is prepared and its sources are read and parsed to form the tokens. A token is the smallest word that the compiler understands for building executables. Each token is assigned a unique token ID when created. When this token is a reserved word, the corresponding reserved word ID is updated in the PROGRAM TOKEN TABLE 305. When the token is a new variable, a row is created in the PROGRAM VARIABLES TABLE 303. For all variables used in the statement, the variable's respective variable IDs are also updated to ensure better referencing. When the token is a device, the device attributes are written in the PROGRAM FILE DEFINITION TABLE 307. All device layouts or structures are written in device child table, i.e. PROGRAM FILE ATTRIBUTE TABLE 308.

Existing legacy applications are written based on the grammar of the particular language. The dependence on grammar restricts the legacy application to be reviewed only by its programmers. In the conventional legacy applications, skills in the grammar of the legacy applications must be acquired for all legacy languages individually. However, the method and system disclosed herein makes it possible to implement a single database that can hold all legacy language programs to display multiple types of data tracking. The method and system disclosed herein does not depend on any internal documents of the computer application and only relies on published language grammars.

The next step 103 defines usage type for the data variables in the PROGRAM TOKEN TABLE 305 for all legacy programs. When the token has valid reserved word ID, the LANGUAGE RESERVED WORDS TABLE 202 is accessed and its rule is executed. Reserved word rules are setup as per the language grammar to identify all variables in the statements of the legacy language and the nature of usage of the variables. The rule engine fetches the value of the usage type for each of the data variables as defined in the grammar. The usage type data is updated in the PROGRAM TOKEN TABLE 305 for the variable ID. The PROGRAM TOKEN TABLE 305 holds data characteristics of variables used in the source statement. In case of errors, the error flags are setup.

Further, step 104 involves grouping of legacy program into blocks of code using the grammar and the rules of the legacy language. Each reserved word has a definition of an execution flow indicator that is set at the start. Using the indicator, programs can be grouped into a series of blocks consistent with the language. Each block is identified with the starting and ending Line ID. The program start rule determines the start of the program. The PROGRAM BLOCK TABLE 306 is created for all legacy programs with each block getting its unique ID with its reference to the source lines. Legacy programs that run into thousands of lines are grouped into program blocks for easier representation by building the PROGRAM BLOCK TABLE 306. The technique of grouping program codes into program blocks is further described with pseudo code in the description of the PROGRAM BLOCK TABLE 306.

Step 105 maps and presents, for each program and its block of codes, the relation between the blocks of code and the nature of usage of its variables. First, the PROGRAM TABLE 301, PROGRAM FILE DEFINITION TABLE 307 and PROGRAM FILE ATTRIBUTES TABLES 308 are read and the report columns are built. Then each row is displayed by reading all rows of the PROGRAM BLOCK TABLE 306 for the given program. The tokens in the source lines for the program block are read for its usage type value. Based on the usage type value each column is displayed with V—value changed, I—Data Input, etc. The display shows the data flow from one device to another for each block of code.

Figure 2:
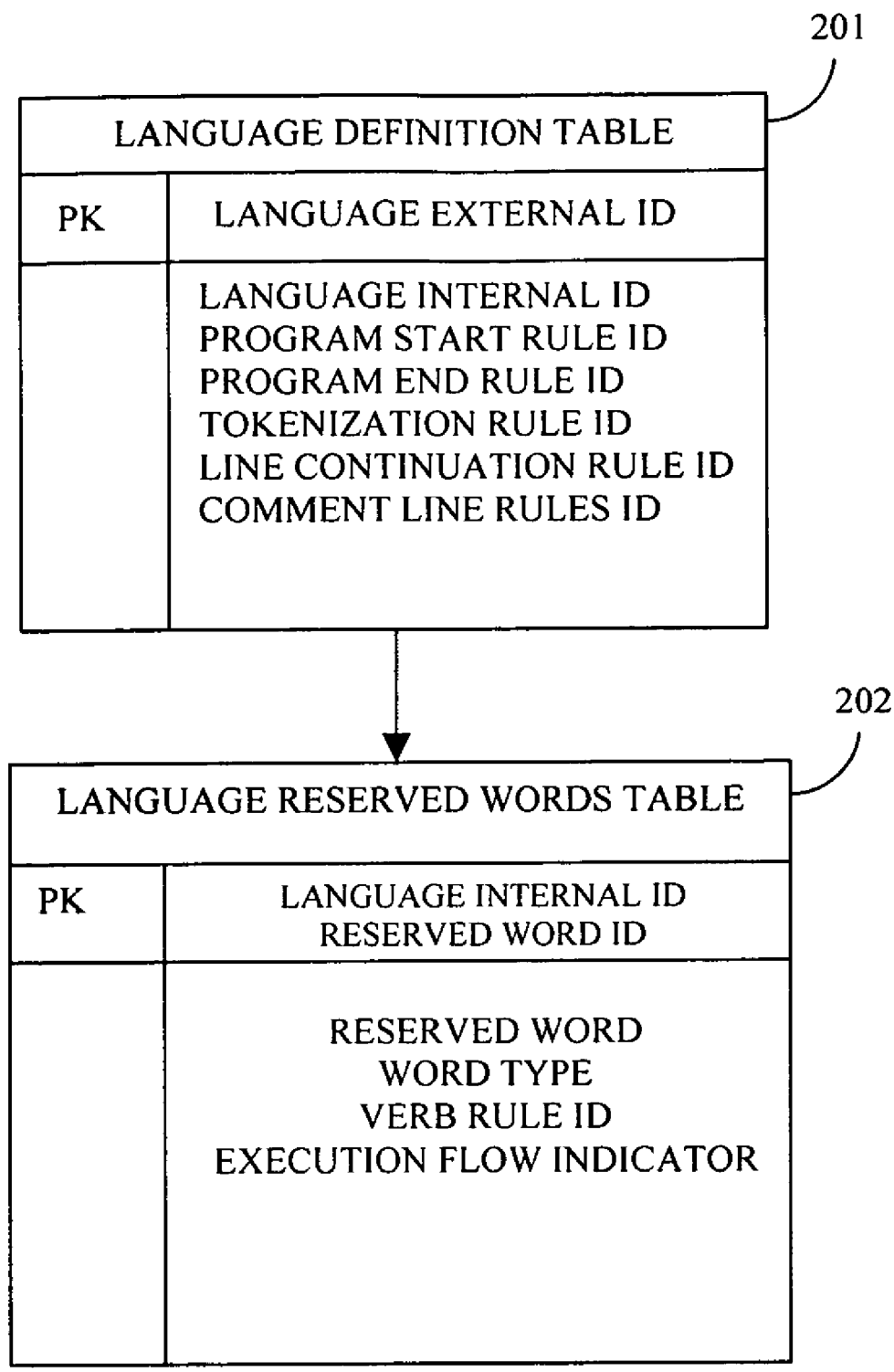
FIG. 2 illustrates the representation of a legacy language in a relational database.

FIG. 2 illustrates the representation of a legacy language in a relational database. The language database specifies the grammar of the legacy program. The language database consists of a LANGUAGE DEFINITION TABLE 201 and LANGUAGE RESERVE WORDS TABLE 202.

The fields in the LANGUAGE DEFINITION TABLE 201 include a language external ID, a language internal ID, program start rule ID, program end rule ID, tokenization rule ID, line continuation rule ID and comment line rule ID. Language external ID indicates how the legacy language is described by the industry. For example the legacy language could be COBOL-85 to reference the language defined by the ANSI standard in the year 1985. For each external ID, a unique language internal ID is allotted. The ID is used to link the PROGRAM TABLE 301 in the program database. The internal ID can be built either randomly, or in a predetermined manner. The method disclosed herein provides effective security even if a user accidentally logs into the database. A new row is created for each of the legacy language. Each row holds the following additional fields. The program start rule ID holds the rule ID that defines a method of locating the start of a program for a specific language. For example, the first statement in the procedure division is the start for COBOL programs. In the case of the FORTRAN language, the system will start execution at the program statement. The program end rule ID holds the rule ID that defines the method to locate the end statement of a program for a given language. The tokenization rule ID holds the rule ID that defines the method of splitting the source statements into individual tokens. The line continuation rule ID holds the rule ID that indicates how to combine consecutive lines of code to form a single statement. The comment line rule ID holds the rule ID that indicates how to identify the comment lines within a program. A legacy system consists of many programs and each program consists of files that contain source statements as defined by the language. The above set of rules present a method to build all tokens for any legacy language program.

The LANGUAGE RESERVED WORDS TABLE 202 comprises the following fields: language internal ID, reserved word ID, reserve word, word type, verb rule ID, and execution flow indicator. Every legacy language publishes its set of reserved words which are referred to as keywords. The usage and definition of keywords are rule bound. Each reserved word is assigned a unique reserved word ID. In the example, shown in the FIG. 13, "ACCEPT reserved word" is given an ID 10001. The assigned ID can be sequential or random. The word type classifies the reserve words into V—Verb, K—Keyword, S—System function, O—Operative symbols and I—Informative. Reserved word with V type denotes that they are statements to perform a step in the program. For example, MOVE verb is for moving data from one variable to another variable, with V as as its word type. Reserved word with K—type indicates that they are keywords to define further attributes for the verb. HIGH VALUES is a reserved word in COBOL to denote that the value will be the highest and is a keyword. A reserved word with S word type denotes that the word represents a system function. DAY-OF-WEEK is a system function to obtain the particular day of the week and represent a system function. A reserved word with an O word type denotes that the word represents an operative symbol. Operative symbols are another form of key word. ">=" is an operative that defines GREATER THAN OR EQUAL TO. A reserved word with I word type denotes that the word represents an information for the program. AUTHOR is a reserved word in COBOL to indicate the name of the person who has written the program.

The execution flow indicator provides a method of grouping statements into various blocks. One typical coding type is as follows. When a reserved word has 'C' as the execution flow indicator, the statement remains in the current block. When a reserved word has S as the execution flow indicator, the statement will initiate a new block. When a statement has Q as the execution flow indicator, the next statement will initiate a new block and it implies that the current block will be completed with the present statement. The method disclosed herein declares attributes to legacy statements in order to group statements into a set of blocks, each block can be set with differing attributes to enable in-depth analysis of the program.

The foregoing example has been provided merely for the purpose of explanation and is in no way to be construed as limiting of the present method and system disclosed herein. For example, each block can be assigned with another attribute—a level number to indicate the dependency of the block with its parent block. The starting level can be set to 01 to indicate all parent blocks and each dependent child block will be set to the next higher number, thereby enabling the tracing the block dependencies.

Figure 3:
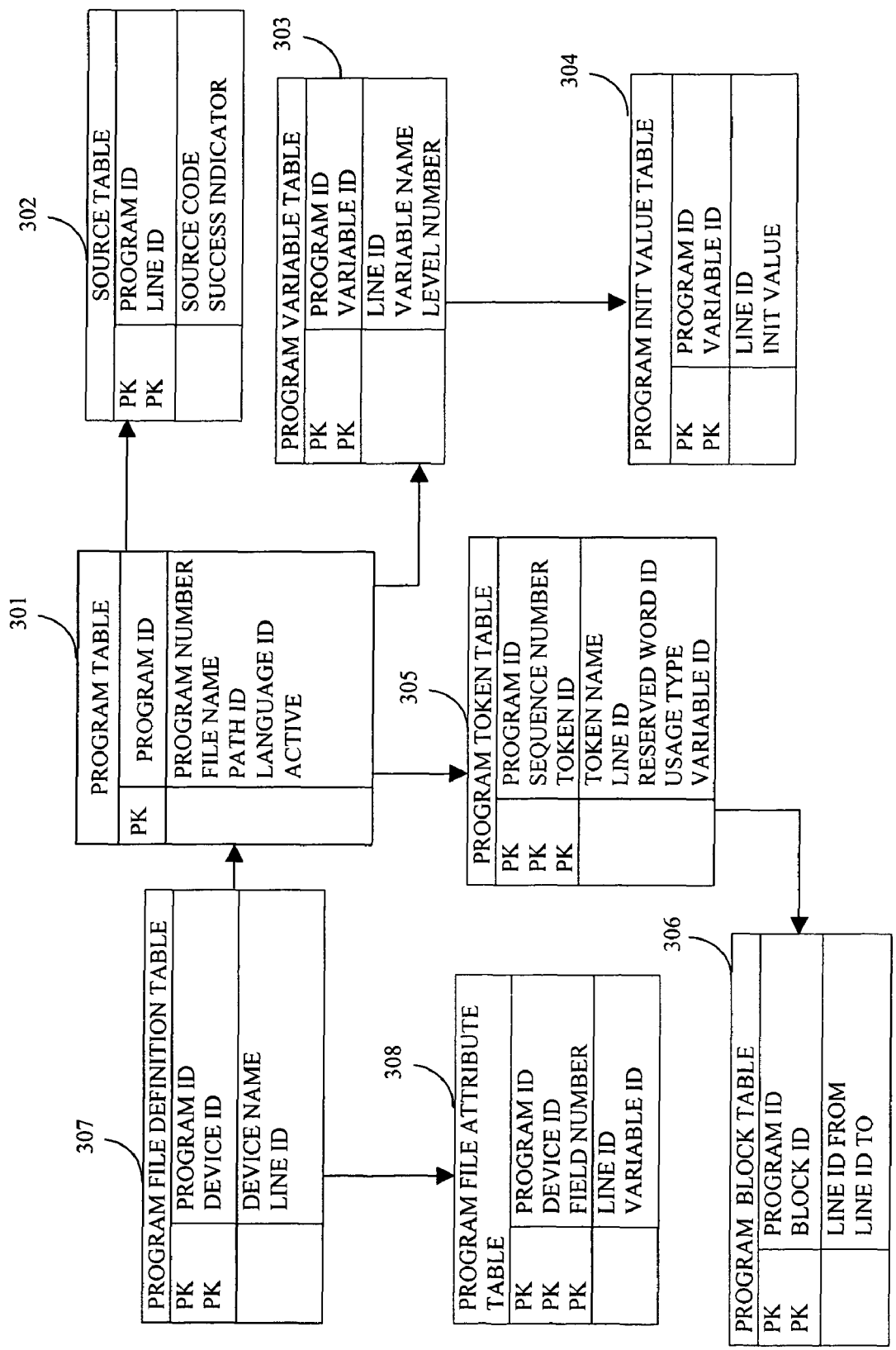
FIG. 3 illustrates the representation of programs of a legacy application in a relational database.

FIG. 3 illustrates the representation of programs of a legacy application in a relational database. The program database shows the relational database of the legacy programs. The relational database is generated from legacy source programs using the rules in the language database. The program database consists of a PROGRAM TABLE 301, SOURCE TABLE 302, PROGRAM VARIABLE TABLE 303, PROGRAM INIT VALUE TABLE 304, PROGRAM TOKEN TABLE 305, PROGRAM BLOCK TABLE 306, PROGRAM FILE DEFINITION TABLE 307 and PROGRAM FILE ATTRIBUTE TABLE 308. All the above tables relate to each other to represent the set of programs consistent with their legacy language. The PROGRAM TABLE 301 holds the information or details or summarization of data of the legacy program. The fields in the PROGRAM TABLE 301 are program ID, program number, file name, path ID, language ID and active.

In the method disclosed herein, the primary table of the program database is the PROGRAM TABLE 301. For every program to be analyzed, one row is allotted with a unique program ID. The unique ID is used to validate programs if programs having same numbers are referred again. The program ID is a common key for all other tables in the database and so it must be unique. The file name is the name of the file that holds the source of the program in the legacy system. The path ID states the location of the program within the legacy system. The language ID is the unique ID to identify the programming language and is used to link with the language internal ID of the LANGUAGE DEFINITION TABLE 201. The active field is used to denote whether this program is active in the legacy system. The SOURCE TABLE 302 stores the source code of the legacy program. The fields in the SOURCE TABLE 302 are program ID, line ID, source code and success indicator. The line ID starts from 1 for the first source line in each legacy program and for every source line added, the line ID is incremented by 1. The source code field contains the actual source line of the program. The success indicator indicates the success when all tables are created correctly. The PROGRAM TOKEN TABLE 305 holds all tokens used in the source statements. The source statements are the actual statements that are used in the program to perform the functionality required in the programs. An illustrative pseudo code representation for building the program token table is as follows:

```
For the program required
    Get all the rules for the internal ID for the given legacy program by
    retrieving the row for language internal ID of the program from
    the LANGUAGE DEFINITION TABLE 201.
For each line of the sources in the SOURCE TABLE 302 for the
given program:
    For each statement that confirms Program start and end rules,
        Apply tokenization rules.
        For each token
            Allot unique token ID for each token,
            Set usage type to NULL,
            Update reserved word ID, when the token is a verb in reserved
            words table,
            Update variable ID, when this variable name matches the variable
            name in the PROGRAM VARIABLE TABLE 303,
            Set Error Indicator to NO when there is no error
            Write the token row.
```

The fields in the PROGRAM TABLE 301 comprise program ID, token ID, token name, line ID, reserved word ID, usage type, variable ID and error indicator. The program ID denotes the program in the PROGRAM TABLE 301. PROGRAM VARIABLE TABLE 303 holds all the variables defined in the program with its attributes. A new row is added to PROGRAM VARIABLE TABLE 303 whenever a new variable is defined in a program. Each row is assigned a unique variable id for referencing. The fields in the PROGRAM VARIABLE TABLE 303 are program ID, variable ID, variable name, and level number. The level number indicates the hierarchy of the variable. The table holds only the variable references and its sequence, but can be extended to include other attributes as well. This structure facilitates a method of holding all variables, but can be expanded to hold a variety of attributes to help any further analysis. One skilled in the art will understand that the table can be enhanced with different attributes to incorporate additional features. The PROGRAM INIT VALUE TABLE 304 is used to hold the start up value that is assigned to the variable. The fields in the program initial value table are program ID, variable ID and init value. The PROGRAM FILE DEFINITION TABLE 307 holds all files or devices used in the program. The table holds all the devices used in a particular program and is used to show the data flow from one device to another. The fields in the PROGRAM FILE DEFINITION TABLE 307 are program ID, device ID, device name, and line ID. A new row with a unique device ID will be added to the program ID for every new device. The device name holds the name of the device and the line ID indicates the line in of the source program in which it is available. The PROGRAM FILE ATTRIBUTE TABLE 308 holds all the fields that are defined in the file. A new row will be created for each new field for a file. The fields in the PROGRAM FILE ATTRIBUTE TABLE 308 include program ID, file ID, line ID, field number, and variable ID.

The PROGRAM BLOCK TABLE 306 groups all program statement into blocks for better representation and analysis. The fields in the PROGRAM BLOCK TABLE 306 are program ID, block id, line ID from and line ID to. A new row is added to the PROGRAM BLOCK TABLE 306 whenever a new block is identified.

Figure 4:
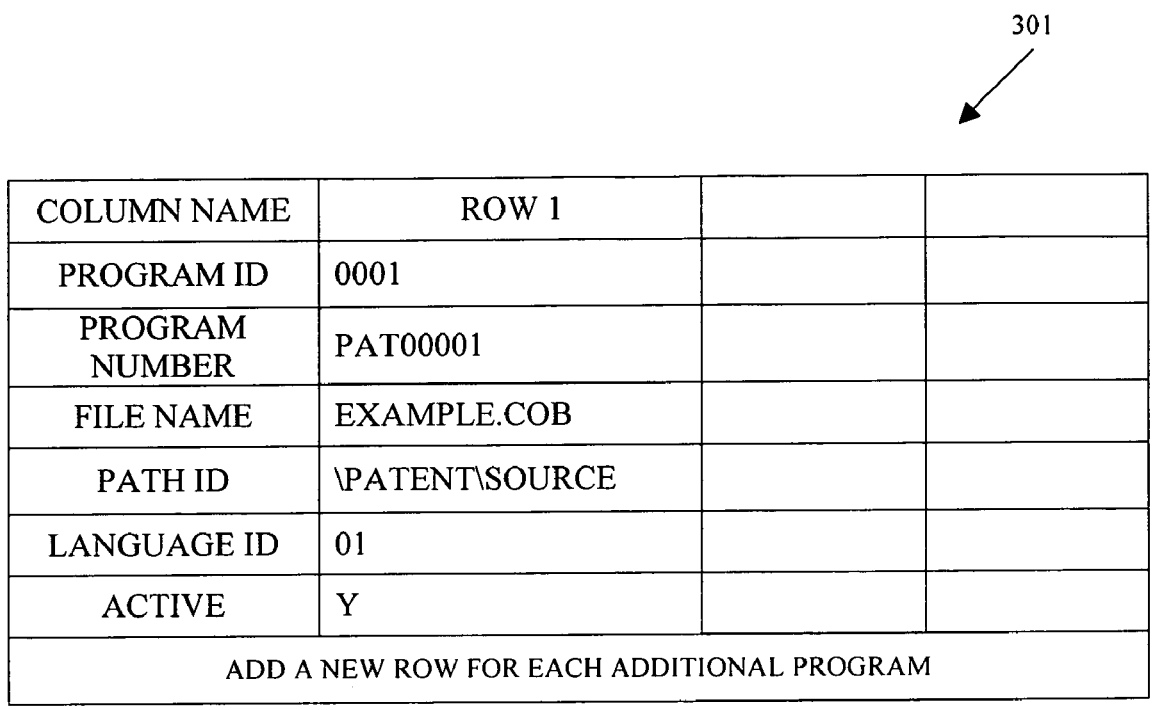
FIG. 4 illustrates a data sample in a "program table".

FIG. 4 illustrates a data sample in a PROGRAM TABLE 301. The first column contains the column names of the PROGRAM TABLE 301. The column names are program ID, program number, filename, path ID, language ID, and the active. The second column shows entries in a file for the example. Program ID is indicated by 0001. The next program will get the next number 0002. The program number is "PAT00001". The file name row shows the example filename EXAMPLE.COB. The path ID shows the path of the current program as patent\source. The language ID is shown as 01 which is the internal ID for COBOL-85 as in LANGUAGE DEFINITION TABLE 201. The active field indicates the active status of the program, wherein it is set to Yes if the program is being used in the system.

FIGS. 5A and 5B illustrate a data sample of a SOURCE TABLE 302 shown for COBOL language. The first column lists the program ID identifying the sources of the program. The second column lists the line ID. The line ID is the key for identifying each statement in a program. The line ID starts with 1 and goes up to the maximum number of lines that the program contains. The third column lists the source code as present in the system. The fourth column lists the success indicator. When a line is parsed correctly, the success indicator has Yes, otherwise it is set to No.

FIG. 6 illustrates a data sample of a PROGRAM TOKEN TABLE 305. The first column lists the program ID of the program. The second column lists the token ID. For each program, the token ID starts with one. The first and the second columns provide the unique key required to refer to any token in a given legacy program. The third column lists the token name. The fourth column indicates the line ID of the token in the SOURCE TABLE 302. The fifth column is the reserved word ID. When the token is a reserved word and is present in the LANGUAGE RESERVED WORDS TABLE 202 for the given language ID, the column indicates the reserved word ID. The sixth column is usage type. The usage type has a single character attribute as shown below.

K—Constant value is referred/updated
R—Values referred
I—Input data values
W—Data values written
E—Entry of user data
D—Display of user data
V—Value changed The usage type of every data variable is updated with a separate process and is set for each variable. The method and system disclosed herein assigns common usage type to all variables used in the legacy program irrespective of the legacy language of the program. The step of assigning common usage type to the variables is used to indicate what the program statement performs on the variable. For example, the source line 54 of the FIG. 6 is:

MOVE HOURS-WORKED TO HOURS-WORKED-OUT

The line has 4 tokens as identified in the sample from 20-23. Token 20 is for HOURS-WORKED. Token 22 is for HOURS-WORKED-OUT. The usage type for token 20 is R and for token 22 is V. The token 20 has the usage type for variable HOURS-WORKED as R implying that the variable usage is "Values referred" The token 22 has the usage type for variable HOURS-WORKED-OUT as V implying that the variable usage is "Value changed".

The seventh column is the variable ID as indicated in the PROGRAM VARIABLE TABLE 303.

FIG. 7 illustrates a data sample of a PROGRAM VARIABLE TABLE 303. The first column lists the program ID identifying the program. The variable ID column lists the unique definition of the variable ID. In this case, the variable ID is set to start with 20000 and each new definition gets the next number. The third column is the variable name as defined in the source program. The fourth column is the line ID where this variable is defined in the source program. The fifth column indicates the level number of the source line that defines the variable. The level number is used to indicate if the variable has children to further define the field.

FIG. 8 illustrates a data sample of a PROGRAM INIT VALUE TABLE 304. The first column lists the program ID identifying the program. The second column is the variable ID. The third column is the Line ID where this init value is declared. The fourth column is the init value column that contains the actual value declared for this program.

FIG. 9 illustrates a data sample of a PROGRAM FILE DEFINITION TABLE 307. The first row lists the program ID for the program. The second row lists the device ID identifying the specific device. The device ID starts with 1 for this program. The third row lists the name of the device. The fourth row is the line ID where the device is declared in the source program.

FIG. 10 illustrates a data sample of a PROGRAM FILE ATTRIBUTE TABLE 308. The first column lists the program ID for the program. The second column lists the device ID for identifying the device. The third column is the field number in the device. The fourth column is the line ID where the field is referred in the SOURCE TABLE 302. The fifth column is the variable ID relating to the PROGRAM VARIABLE TABLE 303.

FIG. 11 illustrates a data sample of a PROGRAM BLOCK TABLE 306. The first column lists the program ID identifying the program. The second column is the block ID in a program. The method and system disclosed herein splits a large program into small blocks since all legacy programs follow a fixed path of execution. The first block starts as 1. Every new block gets the next higher number. The third column line ID indicates the starting line ID of the current block. The fourth column line ID indicates the ending line ID of this block. A separate process is set-up to generate the PROGRAM BLOCK TABLE 306 from the PROGRAM TOKEN TABLE 305. The generation of the PROGRAM BLOCK TABLE 306 can be performed using a computer program. An illustrative pseudo code representation for building the PROGRAM BLOCK TABLE 306 is as follows:

```
Set the current block ID as 1.
Set SKIP-IND to NO
Obtain the program ID for which PROGRAM BLOCK TABLE 306 is
to be created
For each token ID with reserved word not NULL for the Program ID
from the PROGRAM TOKEN TABLE
   If SKIP-IND = NO
      Set the line ID from = Token line ID
      Set the line ID to = Token line ID
      Set SKIP-IND = YES
   END-IF
   Fetch the execution flow indicator for the given reserved word
   CASE EXECUTION FLOW INDICATOR OF
   C   Set the line ID to = Token line ID    /* continue same block */
       Get next token record and continue
   S   Write the current Block record        /* NB starts with this line */
       Set the line ID from = Token line ID
       Set the line ID to = Token line ID
       Increment block count by 1
       Set SKIP-IND = YES
       Get next token record and continue
   Q   Set the line ID to = Token line ID    /* current block ends in this
       line */
       Write the current Block record
       Increment block count by 1
       Set SKIP indicator to NO
       Get next token record and continue
   OTHERS: SET warning message
END.
```

The dependency of current block with the previous block can be built to trace any program flows. This can further be enhanced to identify blocks of code that are dormant. All dependent blocks can be shown in another level for better presentation.

FIG. 12 illustrates data sample of a LANGUAGE DEFINITION TABLE 201. The first row lists the Language external ID. The example illustrates the LANGUAGE DEFINITION TABLE 201 for three legacy languages like COBOL, RPG, and PLI. The second row lists the language internal ID The language internal ID row starts as 01 for the first language and for each new language it is incremented. The internal ID is the key that is used in the program database. The third row is program start rule ID. The fourth row is program end rule ID. The fifth row is tokenization rule ID. The sixth row is line continuation rule ID. The seventh row is comment line rule ID. The program start rule ID, tokenization rule ID, line continuation rule ID and comment line rule ID are required to define the rules of the legacy language.

FIG. 13 illustrates a LANGUAGE RESERVED WORDS TABLE 202. The first column lists the language internal ID that identifies a specific program. The second column lists the reserved word ID identifying a specific reserved word. The third column lists the reserve words that are reserved for specific grammatical usage in the programming language. The fourth column lists the word type classifying the reserve words into verb, keyword, system function, operative and informative. The fifth column lists the verb rule ID. The sixth column lists the execution flow indicator.

FIG. 14 illustrates a representation of the relation between the blocks of code in the legacy program with devices and usages of data variables for the sample program. FIG. 14 displays an example of a data tracking chart. The figure shows the devices used, i.e., the employee data and time listing; and nature of usage of the device in each block of program code, represented as block numbers in the PROGRAM BLOCK TABLE 306. For each device, the column headings include its fields of data, and when the descriptive nature of the display is required. The PROGRAM BLOCK TABLE 306 indicates all the blocks that make up the program. Each block indicates its starting and ending line ID. The PROGRAM TOKEN TABLE 305 indicates all tokens in a line of code and its nature of usage. PROGRAM FILE DEFINITION TABLE 307 indicates all fields that belong to the device. By building the relational database illustrated in FIG. 3, data movements in each block of code are represented in a convenient format, exemplified in FIG. 14.

The representation in FIG. 14 is not meant to be restrictive and multiple other representations are feasible. For example, each block can be shown with variables whose value it is dependent on for execution. Each block can also be shown in a hierarchical manner to show the precedence. It is also possible to highlight only the desired field names in the program and its interaction with the program blocks. For example, the block number 6, comprise line ID 50-59. The tokens for these lines are read from the PROGRAM TOKEN TABLE 305. The nature of usage indicates in this case is R—that indicates that the value is READ, and V—that indicates that the value has changed. The appropriate column is indicated as R and V by matching the field names with the token name. "I" in FIG. 14 represents input, and "W" represents write.

An illustrative pseudo code representation for building the data tracking status chart is as follows:

```
Obtain the program ID for which Data tracking status chart is to be
created.
For this program ID, get the devices from the PROGRAM FILE
DEFINTION TABLE 307.
GET all device attributes from each device from the FILE
ATTRIBUTE TABLE 308
For all blocks in the BLOCK TABLE for this program
   For each block
      Get all tokens used and its usage type
      Case usage type of
      K - Mark the column of the attribute as "K" when it is not E/D.
      R - Mark the column of the attribute as "R"
      E - Mark the column of the attribute as "E" when it is not R/W
      D - Mark the column of the attribute as "D"
      V - Mark the column of the attribute as "V"
      W - Mark the column of the attribute as "W" when it is not R/W
      OTHERS
           Mark the column as NIL
      END CASE
      DISPLAY all column values for the device and its attributes
```

The pseudo code assumes that READ/WRITE, ENTRY/DISPLAY, VALUE CHANGED is the priority required for tracking the chart.

By using the method disclosed herein of organizing the legacy language grammars and program database, this data tracking chart can be enhanced to provide the following capabilities:

1. The PROGRAM BLOCK TABLE 306 can be built with additional hierarchy attributes to build dependencies.
2. Based on the conditionality of each block, the method can be evolved to build all data values needed to test the program flow.
3. By building additional attributes and rules for each reserved word, program lines can be impacted to isolate discarded practices and syntaxes of the earlier versions of the language and compilers.
4. By building additional attributes for variables, program lines can be impacted to identify where mixed usage of data types like characters used as numbers and vice versa.

The foregoing examples have been provided merely for the purpose of explanation and are in no way to be construed as limiting of the present method and system disclosed herein. While the invention has been described with reference to various embodiments, it is understood that the words, which have been used herein, are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspect.

We claim:

1. A method for presenting and mapping data flow between devices of a legacy program, wherein the legacy program comprises legacy constructs and a plurality of data variables within the legacy program, comprising the steps of:
    defining grammar of the legacy program comprising:
        representing said grammar of the legacy program in a language database comprising a language definition table that defines attributes of syntax of legacy language used to construct said legacy program, and a language reserved words table that defines reserve words of the legacy language and unique reserved word identifiers (IDs) associated with the reserved words;
    building a program relational database of said legacy program using said grammar, comprising:
        creating database tables for one or more of program tokens in source statements of the legacy program, data variables defined in the legacy program, and files and said devices used in the legacy program; and
        relating each of said program tokens with one or more of a reserved word identifier (ID) when the program token is a reserved word and a variable identifier (ID) when the program token is a data variable, as defined by the grammar of the legacy program;
    defining the usage type of data variables within the legacy programs;
    grouping legacy program into blocks of code by using execution flow indicators of the reserved words as defined by the grammar of the legacy language for building a program block table comprising a unique block identifier (ID) for each of said blocks of code; and
    mapping and presenting the relation between said blocks of code referenced by said program block table and the data variables.

2. The method of claim 1, wherein said grammar defines the form and interpretation of all statements in the legacy program.

3. The method of claim 1, wherein said step of presenting and mapping analyzes all legacy constructs that would need replacement or substitution when the legacy program is ported from one computer to another computer.

4. The method of claim 1, where said step of presenting indicates the program flow and its dependencies.

5. The method of claim 1, where said step of presenting indicates the instruction of the legacy program at which any device is called for.

6. The method of claim 1, where said step of presenting groups statement into various blocks and indicates the hierarchy of execution of the blocks.

7. The method of claim 6, where said step of presenting indicates flow of data amongst said blocks of program statement.

8. The method of claim 1, wherein said step of presenting and mapping a user data flow is applicable to a multiplicity of source languages.

9. The method of claim 8, wherein said step of presenting and mapping a user data flow operating over a multiplicity of source languages, locates blocks of code that change the value of any given variable within a legacy program.

10. The method of claim 1, wherein said step of presenting implements a single database that can be used to present different types of data tracking.

* * * * *